June 22, 1943.  T. KLOEREN  2,322,715
AIRCRAFT
Filed July 24, 1940  3 Sheets-Sheet 1
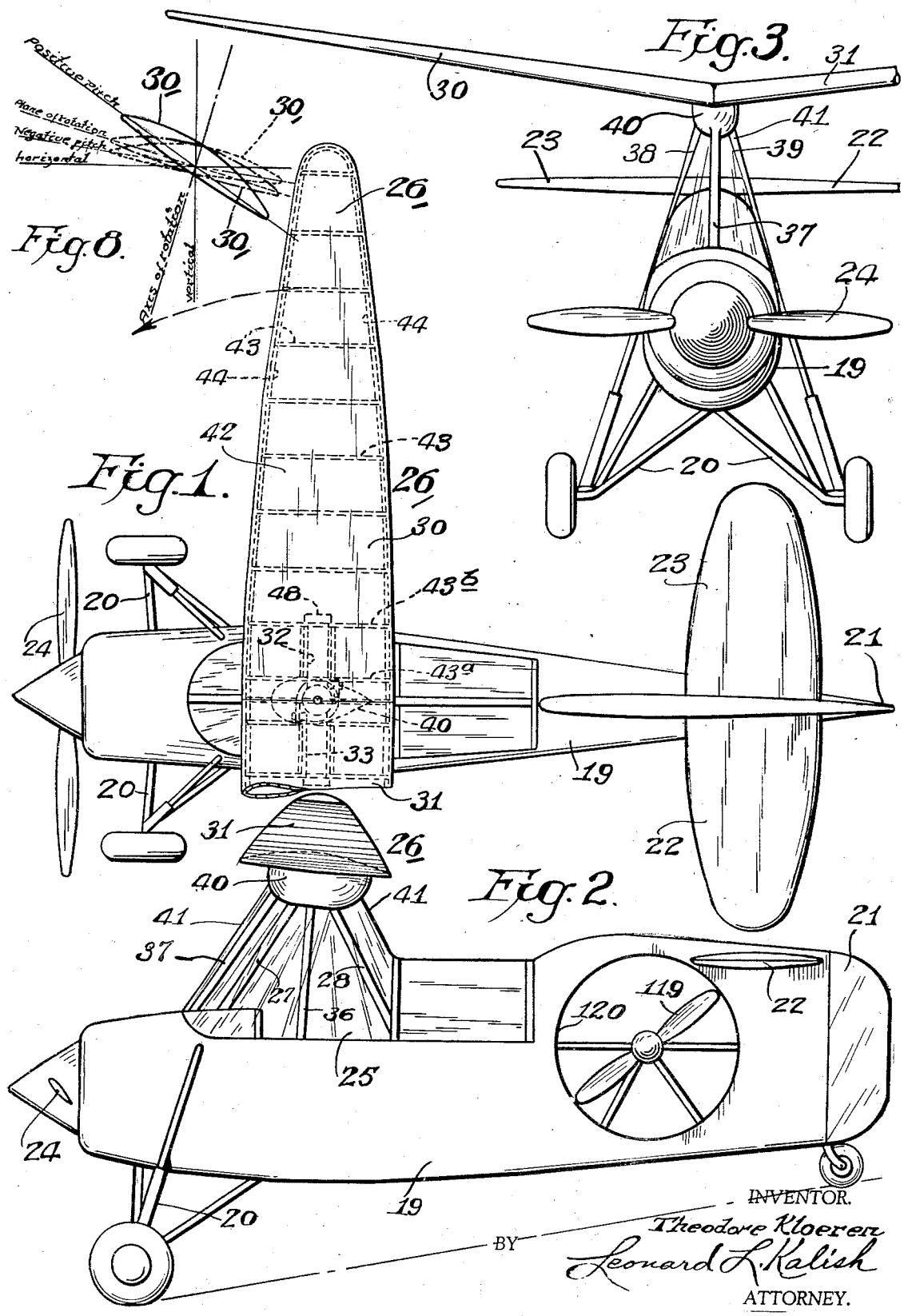

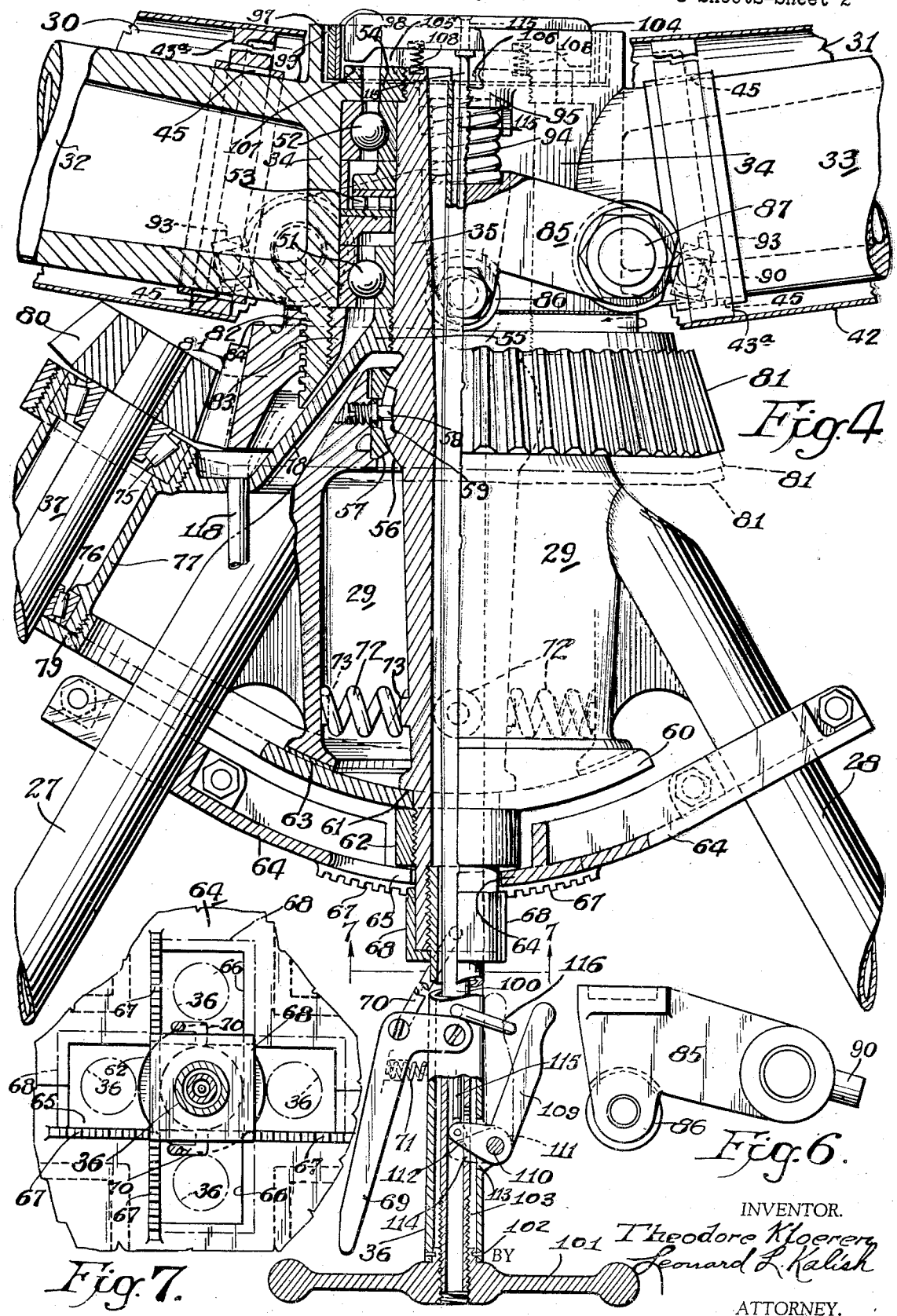

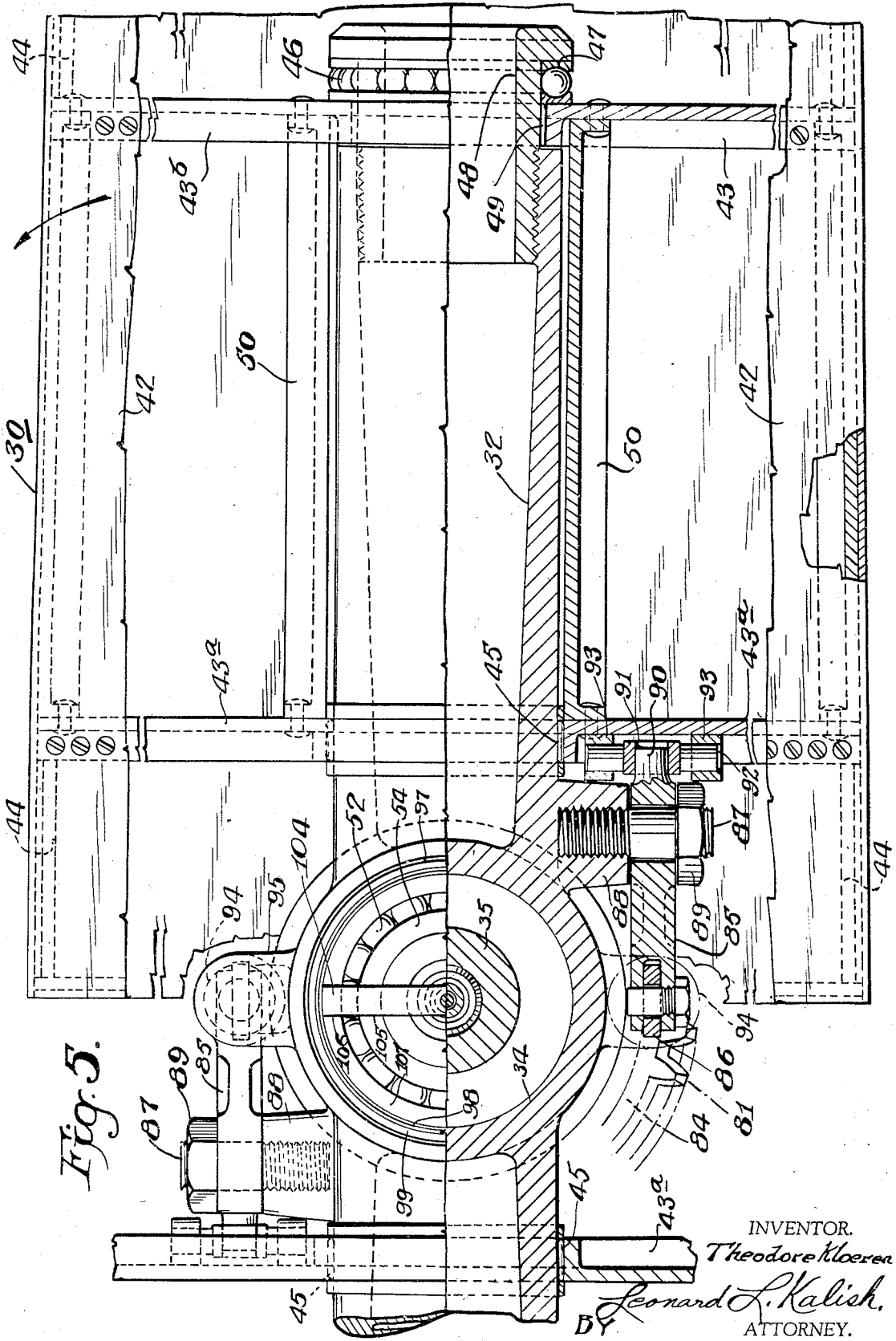

Patented June 22, 1943

2,322,715

UNITED STATES PATENT OFFICE 2,322,715

AIRCRAFT

Theodore Kloeren, Philadelphia, Pa.

Application July 24, 1940, Serial No. 347,272

8 Claims. (Cl. 244—7)

The present invention relates to heavier-than-air flying machines in general, and it relates more particularly to a new and improved flying machine optionally adapted for operation either as a helicopter, or as an autogiro, or as an ordinary airplane having relatively fixed transversely extending wing surfaces.

One of the objects of the present invention is to provide a relatively inexpensive aircraft of simple and durable construction which may be optionally operated either as a helicopter, or as an autogiro, or as an ordinary fixed-wing airplane.

Another object of the present invention is to provide an aircraft which is optionally adapted to take off either vertically in the manner of a helicopter, or with a running start in the manner of a fixed-wing airplane, or like an autogiro, which can hover like a helicopter, which can travel in forward flight either as a helicopter, or a fixed-wing airplane, or as an autogiro, and which can land vertically in the manner of a helicopter, or with a horizontal run in the manner of a fixed-wing airplane, or like an autogiro.

Another object of the present invention is to provide simple readily operable means for setting and controlling the wing-system of the aircraft for any of its foregoing phases of operation.

Another object of the present invention is to provide new and improved automatically-operable means for jointly varying the pitch-setting of the wings to values respectively suitable for power-driven rotation of the wing system, free rotation thereof, and fixed-wing operation.

Another object of the present invention is to provide an aircraft having means whereby application of power to rotate the wing system will automatically cause the wings of said system to assume a pitch-setting suitable for power-driven rotation of said wing system in the manner of a lift-screw, and whereby cessation of power will automatically cause said wings to assume a pitch-setting providing autogyration of said wing system.

Other objects will appear more fully from the following detailed description accompanying drawings and appended claims.

For the purpose of illustrating the invention, there is shown in the accompanying drawings a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring now to the drawings wherein like reference characters indicate like parts:

Figure 1 represents a fragmentary plan view of an aircraft constituting one illustrative embodiment of the present invention.

Figure 2 represents a side elevational view of the aircraft illustrated in Figure 1.

Figure 3 represents a fragmentary front elevational view of the aircraft illustrated in the preceding figures.

Figure 4 represents an enlarged detail view partly in section and partly in elevation, showing the construction at and below the central zone of the wing system; with the wing system being swung around 90° from the position shown in the preceding figures so that the wings now extend in a fore-and-aft or longitudinal direction over the aircraft fuselage.

Figure 5 represents an enlarged fragmentary plan view, partly in section and partly in elevation, looking down on the central zone of the wing system with portions being broken away and omitted to reveal the underlying construction.

Figure 6 represents a side elevational view of one of the pivotally-mounted pitch-varying levers which, when actuated changes the pitch-setting of the wings; said lever being shown disassociated from the rest of the structure.

Figure 7 represents a sectional view taken on line 7—7 of Figure 4, looking upwardly in the direction of the arrows.

Figure 8 represents a diagrammatic cross-sectional view showing the different pitch-settings of a wing for different conditions of operation.

The particular aircraft illustrated in the accompanying drawings includes a fuselage 19 of any suitable shape and construction as may be necessary or desirable for accommodation of pilot, passenger load, if any, power-plant, and the like. Any suitable landing gear 20 may be affixed to the fuselage, and at the rear of the fuselage may be disposed a vertically-extending pivotally-mounted rudder 21, and fixed or adjustable transversely-extending airfoil surfaces 22 and 23.

A front propeller 24 is disposed in front of the power plant of the aircraft, which may comprise an internal combustion engine, said propeller preferably being connected to said power plant through a clutch under the pilot's control whereby the propeller may be connected with or disconnected from said power plant, as desired.

Immediately above the cockpit 25 is disposed a wing-system indicated generally by the numeral 26, optionally adapted for rotation (power-driven or free) or for fixed-wing operation, said wing system being connected to the fuselage framework by any suitable pylon construction. In the illustrated embodiment of the present invention, the pylon comprises a pair of inclined struts 27 and 28 disposed in a vertical plane extending generally longitudinally of the aircraft, and having their lower ends connected with the fuselage framework and having their upper ends welded to or otherwise connected with a socket bearing member 29 illustrated more particularly in Figure 4. A pair of inclined taut wires 38 and 39, disposed in a common plane extending transversely of the aircraft, may interconnect the upper end of the pylon with opposite sides of the aircraft fuselage.

The wing-system 26 includes a pair of generally oppositely extending variable-pitch wings 30 and 31 about their longitudinal axes on stub-shafts 32 and 33. These latter stub-shafts extend outwardly from a common hub 34 rotationally secured to a generally upright tiltable pivot shaft 35, which may be tilted relative to the aircraft fuselage by means of a control-tube 36 extending downwardly from shaft 35 to within reach of the pilot in the cockpit 25. The wing-system 26 may be rotated under power by an inclined drive-shaft 37, which may be driven by the same power plant which drives the front propeller 24.

A streamline fairing 40 may cover the mechanism at the upper end of the pylon to reduce wind resistance, and any suitable transparent sheet material 41, as for example, "Plexiglass" or safety-glass or the like may extend downwardly from said fairing 41 to the fuselage 19 thereby to enclose the cockpit 25 and encase the elements 27, 28, 36, 37, 38 and 39.

Referring now more particularly to Figures 1 to 5 inclusive, the wing elements 30 and 31 of the wing system 26 will be seen to comprise a cantilever-type sparless wing having a stressed skin surface 42 tightly drawn over a series of spaced wing-ribs 43 of gradually decreasing size, which ribs may be held a suitable fixed distance apart by spacer members or stringers 44 extending along the opposite edges of the wing.

The two wings 30 and 31 each taper in thickness from their central hub outwardly, and are preferably permanently set at a slight di-hedral angle. In the preferred embodiment of the present invention, the opposite longitudinal edges of the wings are identical and are each designed to function as a "leading" edge for purposes which will presently appear.

As more particularly illustrated in Figures 1 and 5, the wings 30 and 31 are rotationally mounted on their respective stub-shaft 32 and 33 which extend through any desired number of wing-ribs 43, as for instance through two wing-ribs 43a and 43b. At the points where the stub-shafts extend through ribs 43a, needle roller-bearings 45 may be provided intermediate stub-shaft and rib to reduce friction to a minimum. If desired, a separate thrust-receiving ball-bearing 46 may be provided between the second rib 43b and the outwardly-extending shoulder 47 of a nut-like member 48 which may be threaded into the end of the stub-shaft 32. A second needle roller-bearing 49 may be provided intermediate the nut-like member 48 and the wing-rib 43b at the point where the former projects through the latter. In actual operation with the wing-system 26 rotating, the end thrust produced by centrifugal force acting on the wings 30 and 31 will be taken by the thrust-bearings 46, and these wings may be readily rotated about their longitudinal axes, that is to say their pitch may be readily varied, with a minimum amount of frictional resistance.

A series of torque-transmitting structural members 50 may extend intermediate the ribs 43a and 43b and may have their ends riveted or otherwise fixedly secured thereto in order to transmit turning movement (in a pitch-varying sense) from rib 43a to rib 43b, which may then turn the rest of the wing. If desired, however, the taut skin surface of the wing may be relied upon to transmit turning movement of rib 43a directly to the rest of the wing.

The stub-shafts 32 and 33 extend outwardly from, and may be formed integrally with, a common hub 34 which is rotationally secured to the upper end portion of the central pivot shaft 35. A pair of spaced ball-bearings 51 and 52 may be interposed between the pivot shaft 35 and the hub 34 to take radial thrust, and a multi-row roller-bearing 53 may be disposed intermediate the bearings 51 and 52 to take any axial or end thrust between the hub 34 and the shaft 35. These bearings 51, 52 and 53 may be retained on the shaft 35 by means of an upper retaining nut 54 screwed on to the upper end of said shaft, and a lower annular collar 55 screw-threadedly mounted on the shaft 35 immediately below the inner race of the bearing 51.

Below this collar 55, shaft 35 bears a spherically-shaped protuberance 56 which constitutes the ball portion of a ball-and-socket-joint permitting universal movement between the shaft 35 and the pylon. The socket portion of this joint is constituted by a concavely-spherical sectional bearing 57 which may be fixedly carried by the pylon in an opening disposed at the upper end of the shell 29.

If desired, four pivot pins 58 may be arranged at 90 degree intervals around the bearing 57, with one diametrically-opposed pair of pins 58 being disposed in a vertical plane extending longitudinally of the aircraft fuselage, and with the other pair being disposed in a vertical perpendicular plane extending transversely of the aircraft fuselage. These pins 58 extend radially inwardly into registering generally vertical slots 59 formed in the outer surface of the shaft ball-portion 56, thereby limiting swivelling movement of shaft 35 to two perpendicularly-related generally vertical planes, one extending longitudinally of the aircraft and the other extending transversely thereof, and also locking shaft 35 against rotation about its longitudinal axis relative to the fuselage.

A load-bearing thrust-plate 60, having a smooth upper concavely-spherical surface whose center of curvature coincides with the center of the ball-and-socket joint connecting shaft 35 with the pylon, may be secured on the shaft 35 against the outwardly-extending shoulder 61 by a nut 62 threaded onto the lower end portion of said shaft. The lower annular rim of the pylon shell 29 may be somewhat thickened or flanged, and may be faced with bearing metal 63 shaped to conform with the upper surface of the thrust-plate 60. This construction provides a bearing surface of ample area to take the sustention load transmitted from the overhead aircraft-supporting wing system 26 through the shaft 35 to the pylon, and considerably reduces the load on the balland-socket joint 56, 57, relieving it from any undue strain.

Tilting of shaft 35 relative to the fuselage 19 may be manually effected by seizing the control-tube 36, which constitutes a prolongation of said shaft screw-threadedly connected therewith, and moving it in the desired direction. Any suitable means may be provided for locking the shaft 35 in the adjusted tilted position. Thus for example a curved spider-like guide member 64, having two crossed arcuately curved guide slots 65 and 66 respectively extending in a longitudinal direction and in a transverse direction, may be bolted to or otherwise fixedly mounted on the pylon struts 27 and 28, and one or both side edges of these intersecting slots 65 and 66 may be bordered by segmental racks 67 whose teeth extend downwardly. The lower end portion of shaft 35 protrudes through the slot opening in the spider-like member 64, and has mounted thereon immediately below said racks an externally rectangular-shaped dog 68 which is axially shiftable along said shaft to bring its upper edge into and out of interlocking engagement with the downwardly-extending teeth of the racks 67. This dog may be slidably keyed or splined to the shaft 35, and may be actuated by a bell-crank hand-lever 69 pivotally mounted on the control tube 36 and linked to said dog by a link-member 70. The dog 68 may be normally urged into its rack-engaging shaft-locking position by a coiled compression spring 71 interposed between the hand-lever 69 and the juxtaposed outer wall of the tube 36.

Thus, by merely seizing hand-lever 69 and the juxtaposed portion of control-tube 36 in one hand and bringing them relatively together in opposition to the compression spring 71, the link 70 will be drawn downwardly pulling dog 68 clear of the rack teeth and freeing shaft 35 for tilting movement, whereupon the lower end of said shaft 35 may be slid either in a fore-and-aft direction in curved slot 65, or in a lateral direction in the curved cross slot 66, by any desired amount, thereby to tilt the wing system as desired. Then, by merely releasing hand-lever 69, compression spring 71 is permitted to expand, snapping dog 68 upwardly into secure interlocking engagement with whichever rack teeth happen to be in juxta-position therewith, thus securely locking shaft 35 in its newly-adjusted position.

If desired, a series of radially-arranged coiled compression springs 72 may be inserted intermediate the lower skirt portion of the socket-supporting shell 29 and the shaft 35, to serve as a cushion therebetween during change in inclination of the shaft. These springs 72 may be retained in position in any suitable manner, as for example by having projections 73 respectively formed on the inner surface of the shell 29 and on the outer surface of shaft 35, extending into the ends of said springs.

The aircraft of the present invention includes power-actuable driving means for rotationally driving the wing system 26, causing it to rotate about the axis of its pivot shaft 35. In the illustrated embodiment such means includes an inclined drive-shaft 37 flexibly connected, either through a flexible drive or through universal joints, with the power plant of the aircraft. A clutch is preferably provided between this drive-shaft 37 and the power plant, so that the latter may be disconnected from the drive-shaft when desired.

This drive-shaft 37 may be journaled in suitable tapered roller-bearings 75 and 76 mounted in the upper and lower ends of an inclined cylindrical casing 77, which may be supported at its upper end by an encircling arm 78 projecting downwardly and outwardly from the shaft collar 55, and which may be supported at its lower end by an encircling arm 79 extending upwardly and outwardly from the thrust-plate 60.

At the upper end of the drive-shaft 37 is mounted a bevelled pinion gear 80 which is constantly in mesh with an axially-shiftable drive bevel gear 81 whose hub is loosely screw-threadedly mounted on a relatively steeply-threaded lower portion 82 of the hub 34. An externally-threaded retaining sleeve 83 is screwed inside the hub portion 82, and abuts against the outer face of the lower-ball bearing 51, thereby fixing said bearing in place.

The upper surface of the axially-shiftable bevel gear 81 may bear an annular track 84, which may be recessed or not, on which may directly rest the lower ends of a pair of pivotally-mounted pitch-varying levers 85 disposed on opposite sides of the hub 34, or else track-following rollers 86 may be provided at the ends of said levers to run on said track 84. These levers 85 may be pivotally supported on pivot pins 87 threaded into recesses in bosses 88 extending outwardly from the hub 34 in directions transverse to the longitudinal axis of the wings or blades, and may be secured in position by lock nuts 89.

The ends of these levers 85 opposite the track-following ends 86 may be reduced in size as at 90, and may extend axially-slidably into holes 91 passing transversely through trunnion-pins 92. The opposite ends of each of these trunnion-pins 92 are rotatably supported in spaced end-bearings 93 affixedly secured to the wing-ribs 43a to one side of the axes of the stub-shafts 32 and 33, and these trunnion-pins 92 are also each axially slidable in said end-bearings 93.

From the foregoing it will be seen that any pivoting movement of the levers 85 about their fulcrum pins 87 will be transmitted through trunnion pins 92 and bearing 93 to the wing-ribs 43a, and will result in corresponding turning movement of the wings or blades 30 and 31 about their respective longitudinal axes, thereby effecting change in the pitch-setting of said wings or blades.

Spring means are preferably provided for constantly pressing the lever end-rollers 86 down against track 84 on the loosely-mounted axially-shiftable bevel gear 81, thereby normally tending to move said gear downwardly into the lowermost position indicated in dotted lines in Figure 4. Such means may comprise two axially-expansive coiled compression springs 94 disposed one on either side of the hub 34, each spring being interposed between an outwardly-extending abutment portion or boss 95 formed integrally with the rotor hub 34 and the respectively associated lever 85. If desired, the opposite ends of these springs 94 may be fitted into shallow recesses in the abutment 95 and in the lever 85 to retain them in place.

Additional force tending to move the loosely-mounted bevel-gear 81 downwardly into its lowermost position comprises the weight of said gear, plus the unbalanced weight of the levers 85, and also during rotation of the wing system 26, the levers 85 will be forced downwardly against the bevel gear 81 because of the higher location of their centers of gravity relative to their pivotal axes, for due to their motion through space, each lever will tend to turn about its pivot until its center of gravity trails its pivot axis in the plane of rotation of said axis.

Means are also preferably provided for quickly stopping the rotation of the overhead wing system 26 and for locking it with the opposed wings extending in a direction generally transversely of the fuselage, so that they may function as fixed-wing surfaces having proper incidence for supporting the aircraft during forward flight, in the manner of a high-wing monoplane.

Thus, in the illustrated embodiment of the present invention, the upper end of the rotor hub 34 is formed with a cylindrical recess 97 whose cylindrical side-wall constitutes a brake drum surface, against which may be forced the internally-expanding brake-shoes 98 which are surfaced with any suitable brake-lining 99. These brake-shoes 98 may be actuated by hydraulic means or by mechanical means or both. In Figure 4, mechanical means are indicated whereby the pilot may apply or release the brake as desired. These means will be seen to include an elongated hollow tension-tube 100 disposed coaxially within the hollow rotor-shaft 35 and its continuing control-tube 36, and having its upper end portion mechanically connected by any suitable preferably spring-biased camming means (not shown) arranged to expand the brake-shoes 98 into frictional contact with the brake-drum 97 upon downward movement of the brake-tube 100, and further arranged to retract said brake-shoes from the brake-drum upon upward movement of the brake tube 100. A hand-wheel 101, which is rotatably mounted at the lower end of the control-tube 36, and which may be fixed axially by means of one or more retaining pins 102 which extend through the side-wall of the control-tube 36 and slidably into an annular groove in the hand-wheel, may have its internally-threaded hub screw-threadedly engaged with the externally-threaded lower end 103 of the brake-tube 100, so that rotation of hand-wheel 101 in one direction will pull the brake-tube 100 downwardly thereby operatively applying the brake, and so that rotation of hand-wheel 101 in the reverse direction will either push said brake-tube 100 upwardly or else permit it to be lifted by separate spring-means, thereby to release said brake.

The particular means illustrated in the accompanying drawings for locking wing system 26 against rotation with the individual wings 30 and 31 extending in a direction generally transversely of the fuselage comprises a non-rotatable cross-bar 104, of generally rectangular cross-section, which is arranged for vertical reciprocation in diametrically opposed slots 105 formed in the lock-nut 54 disposed at the upper end of the shaft 35. The two opposed ends of this cross-bar 104 are adapted to descend into two diametrically-opposed slots 106 formed in an upwardly extending annular bead 107 disposed inside the brake-drum 97, also formed integrally with the rotor hub 34.

These slots 106 are so located relative to the ends of the wing-locking cross-bar 104 that when they are interlockingly engaged the two wings 30 and 31 extend transversely of the fuselage in the manner of ordinary fixed wings.

Two axially-expansive coiled springs 108 may be interposed intermediate the upper end of the shaft 35 and the underside of the cross-bar 104, thereby normally to hold said cross-bar lifted out of engagement with the rotor notches 106. If desired, the ends of these compression springs 108 may be fitted into shallow recesses in order to secure them against displacement.

When it is desired to lock the wing system against rotation, cross-bar 104 may be shifted downwardly by pivoting a bell-crank hand-lever 109, which pivots about a fulcrum pin 110 whose ends are secured in a pair of spaced lugs 111 extending outwardly from the control-tube 36, towards the juxtaposed control-tube 36, as indicated in dashed-dotted lines in Figure 4. This pivoting movement of the bell-crank lever 109 brings its short leg 112, which extends radially inwardly through juxtaposed vertical slots 113 and 114 in the tubes 36 and 100 respectively, downwardly, pulling down with it the cross-bar operating-rod 115 which is pivotally connected at its lower end with the lever 109 and which may be fixedly or pivotally connected at its upper end with the cross-bar 104. This causes the ends of the cross-bar 104 to enter into the rotor slots 106 as the latter momentarily move into registration therewith, thereby securely locking the wing system against rotation in the desired position. The wing-locking cross-bar 104 may be secured in its operative wing-locking position by slipping the outer end of a handle-holding loop 116, which is pivotally secured to the control-tube 36, down over the outer end of the pivoted cross-bar-operating hand-lever 109.

With the longitudinal axis of the aircraft fuselage 19 horizontal, and control-tube 36 locked at its zero or neutral setting, that is to say locked at the intersection of the guide-slots 64 and 65, the longitudinal axis of this tube 36 which coincides with the axis of rotation of the wing system 26 is inclined rearwardly from the vertical by some small angle, as may be observed from Figure 2.

Due to the fixed di-hedral setting of the wings 30 and 31 in the illustrated embodiment of the present invention, these wings when rotating about shaft 35 will describe a generally conical surface of rotation. However, since this conical surface of rotation almost approximates a plane surface perpendicular to the axis of rotation, in the following description reference will be made to a "plane" of rotation to simplify consideration of the subject matter, although it is to be understood that with the wings arranged at a slight di-hedral setting as in the illustrated embodiment, there would not exist any true single plane in which these wings would rotate.

Referring now more particularly to Figure 8, the wing 30 is there shown in cross-sectional outline in three different pitch-settings, respectively corresponding to three different flight conditions. When it is desired to operate the aircraft as a helicopter, driving power is applied to the drive-shaft 37, which transmits it to the bevel pinion gear 80 which in turn rotates the meshing loosely-mounted axially-shiftable bevel gear 81. The initial turning movement of bevel gear 81 causes it to thread itself axially upwardly along the relatively steeply-threaded shaft-like portion 82, thereby taking up its lost motion, until it contacts the annular stop shoulder at the upper end of said threaded hub portion as illustrated in Figure 4. This axially upward shift of the bevel gear 81 forces the track-following rollers 86 at the ends of the pitch-varying levers 85 upwardly in opposition to the downward forces exerted by the coiled compression springs 94, and pivots these levers 85 about their fulcrum pins 87 swinging the lever ends 90, which are connected with the wing ribs 43a, downwardly, causing the wings to assume a positive pitch relative to the plane of rotation about shaft 35. This positive pitch-setting for wing 30 has been diagrammatically illustrated in full lines in Figure 8.

Now, should the application of power to drive-shaft 37 be interrupted for any reason whatsoever, as for example by reason of engine failure or intentional disconnection of drive-shaft 37 from the power plant, the pinion gear 80 will immediately cease urging its meshing bevel gear 81 upwardly on its steeply-threaded shaft 82, thus permitting the compressed springs 94 to expand downwardly and force the roller-ends 86 of pitch-varying levers 85 downwardly to the lowermost position indicated in dotted lines in Figure 4. This downward movement of the lever-rollers 86 forces the loosely-mounted bevel gear 81 downwardly on its steeply-threaded shaft 82 by an equal amount, to its lowermost position also indicated in dotted lines in Figure 4. This downward shift of the loosely-mounted bevel gear 81 is also aided by the additional forces mentioned hereinbefore, and is accompanied by a corresponding relatively backward turning movement of this gear on its threaded shaft 82. Any suitable fixed stop means may be provided for limiting the downward movement of gear 81 on shaft 82.

The forward ends 90 of the pivoted pitch-varying levers 85 will thus be lifted upwardly, decreasing the pitch-setting of the wings, preferably by an amount sufficient to bring wing 30 into a position lying intermediate its plane of rotation (about shaft 35), and a horizontal plane, as indicated in dashed lines in Figure 8, and bringing the other oppositely moving wing 31 into a corresponding pitch-setting. In this position, the blades or wings will have passed through their plane of rotation and come to rest at some negative pitch-setting relative to their plane of rotation, but with wing 30 still having a positive pitch relative to a horizontal plane. This condition produces autogyration of the wing system in the same direction in which the wing system was rotating when driven by engine power. Thus, the resultant forces produced by the lift and drag forces acting on the wings 30 and 31 will be inclined in advance of parallels to the axis of rotation, thereby producing autogyration of the wing system in the same direction in which it rotated when it was being driven under power.

Means are preferably provided for permitting drive-shaft 37 to run free of its associated power plant during this autogyration of the wing system, so that the power plant may not act as a brake or drag tending to slow up or stop autogyration. Such means may comprise an overrunning clutch disposed intermediate the power plant and the drive-shaft 37, or an ordinary pilot-controlled clutch disposed intermediate the two.

Should it be desired to operate the aircraft as an ordinary high-wing monoplane having relatively fixed wings and with horizontal propulsion being provided by the front propeller 24, all the operator need do is to move push rod 118 (of which there may be one or more) bearing against the lower rim of the axially shiftable bevel gear 81 upwardly by an amount sufficient to lift said bevel gear from its lowermost position shown in dotted lines in Figure 4 to the position there shown in dashed-dotted lines. If the aircraft is operating as a helicopter with bevel gear 81 at its top position, then rod 118 may be moved up into its operative position to limit downward movement of gear 81 produced by cessation of driving power. This dashed-dotted position of gear 81 corresponds to the "fixed-wing" setting of the wing system, and through the pitch-varying elements 84, 86, 85 and 92, brings the wings to the zero pitch-setting, as shown in dashed-dotted lines for wing 30 in Figure 8. In this position, the wings 30 and 31 when locked against rotation each have an equal positive angle of incidence relative to the line of flight, and their adjacent ends are in exact alignment with each other. It will be noted that in this fixed-wing position, an edge of one of the wings (in Figure 1 it would be wing 31) which was formerly the leading edge during rotation becomes the trailing edge when the wings are fixed, and the edge which was formerly the trailing edge during rotation, becomes the leading edge.

An instrument may be provided on the instrument-panel in the cockpit having a rotatable pointer whose movements are co-related with the rotation of the overhead wing system, so that when the pilot has applied the brakes to stop the rotation of the wing system preparatory to locking it in position, he may be constantly apprised of the position of the wing system relative to the longitudinal axis of the fuselage, so that he may select the most propitious moment for pulling the wing-locking cross-bar 104 downwardly into its operative notch-engaging position.

Should it be desired to again operate the aircraft as a helicopter, the pilot need merely release the cross-bar 104 and re-apply power to the drive-shaft 37, whereupon the wings or blades will again assume their positive pitch-setting suitable for helicopter flight, and will thereafter sweep through space to provide the necessary sustention for the aircraft.

If desired, the pitch-setting for the wings in autogyration may be positive relative to the plane of rotation of the wings, but of lesser value than when the wings are power-driven. This pitch-setting may be effected by providing releasable stop means for halting the pitch-change produced upon cessation of driving power. Such stop means should be releasable in order to permit the pitch-setting of the wings later to be decreased still further until the wings lie in their plane of rotation at zero pitch, for fixed-wing operation. This could readily be effected in the illustrated embodiment of the present invention by limiting downward movement of bevel gear 81 to the position shown in dashed-dotted lines in Figure 4 by any suitable fixed means, and by utilizing releasable rod means 118 to halt downward movement of gear 81 at a point intermediate its full and dashed-dotted line positions illustrated in Figure 4. In other words, instead of rod 118 serving as releasable stop means for fixing the wings in their zero pitch-setting for fixed-wing operation as illustrated, its upper end may operate at a higher elevation for releasably fixing the autogyrational pitch-setting of the wings, with gear 81 being limited to maximum downward movement to the dashed-dotted position shown in Figure 4.

When the aircraft is being operated as a helicopter, the torque reaction produced on the fuselage by the application of rotative power to the rotor tends to rotate the fuselage in a counter-direction, and some means must be provided for neutralizing this torque-reaction. In the particular embodiment of the present invention selected for illustration, such means comprise an auxiliary power-driven air-screw or propeller 119 mounted to rotate about an axis extending transversely of the fuselage and set some distance to the rear of the axis of rotation of the overhead rotor. This auxiliary propeller 119 may be set in a well 120 extending transversely completely through the fuselage, as illustrated in Figure 2, and may be driven when needed either by the main power plant of the aircraft or by a separate electric motor or the like. If desired, two such propellers may be provided, one ahead of and the other behind the rotor axis of rotation.

It is to be expressly understood that other anti-torque means may be provided in lieu of the propeller means 119, as for example fixed or adjustable inclined anti-torque surfaces disposed fore-and-aft and cooperating with the slip-stream of the overhead driven rotor to keep the fuselage from spinning reversely about the rotor axis of rotation.

When the aircraft is being operated as a helicopter with the overhead wing system being rotated by engine power applied directly thereto, the wings when advancing into the relative wind exert a greater lift than when they relatively retreat on the opposite side of their cycle. This tends to tilt the axis of rotation in a plane transverse to the relative wind and would tend to cause the aircraft to barrel-roll to one side. This rolling tendency may be neutralized by the pilot slightly tilting the control-tube 36 in the opposite direction to shift the position of the center of gravity of the aircraft relative to the axis of rotation.

During helicopter operation, propulsion of the aircraft in a horizontal direction may be effected by tilting the rotating wing system in the desired direction by means of the control-tube 36. During fixed high-wing monoplane operation, left and right or vertical turns may be effected under direct control by tilting control-tube 36 into the slots 65 or 66 respectively.

If desired, the aircraft of the present invention may be operated in the manner of a true autogiro, with the front propeller providing forward propulsion and with the wing system autogyrating to provide sustention for the aircraft.

From the foregoing, it will be seen that the aircraft of the present invention may be optionally set to take off vertically in the manner of a helicopter, or steeply like an autogiro, or with a running start like a high-wing monoplane, and may hover as a helicopter, and may travel forward either as a high-wing monoplane, or as a helicopter, or indeed as an autogiro, and may land vertically as a helicopter, or as an autogiro, or as a high-wing monoplane, and that the change from one phase of operation to any other phase of operation may be quickly, and easily and safely effected while in the air. Thus, the hereinabove-described aircraft may be operated to provide the advantages of vertical helicopter ascent, rapid fixed-wing forward flight, and the safety feature of an autorotating overhead wing system permitting safe landing in case of engine failure. In fact, the aircraft of the present invention combines the advantages of a helicopter, an autogiro, and a fixed-wing airplane, and by providing a constantly-available choice of operation, does away with the disadvantages flowing from restriction to any one of the foregoing phases of operation.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. In air aircraft having an overhead rotatable wing system including a plurality of variable-pitch airfoils extending outwardly from a common hub, a driving gear, a meshing axially-shiftable driven gear loosely screw-threadedly mounted on said hub below said airfoils and arranged screw-threadedly to advance therealong upon application of power to said driving gear, stop means limiting axial movement of said gear on said hub, a plurality of pitch-varying levers pivotally carried by said hub and each having their one end connected with an airfoil and having their other end bearing against a portion of said axially-shiftable gear, and spring means constantly pressing said latter lever ends against said axially-shiftable gear, whereby application or cessation of driving power to the driving gear will be accompanied by corresponding variations in the pitch of said airfoils.

2. In an aircraft having a power plant, an overhead lift-screw having a plurality of outwardly-extending airfoils each rotatably adjustable about their respective longitudinal axes, said airfoils extending outwardly from a common rotatably-mounted hub, mechanical pitch-varying means associated with said airfoils adapted, when actuated, to change the pitch-setting of said airfoils, transmission means intermediate said power plant and said lift-screw for transmitting rotary motion to the latter, including a driving gear adapted to be rotated by said power plant, a meshing driven gear loosely screw-threadedly mounted on a relatively steeply-threaded shaft-like portion extending axially therethrough and arranged to advance axially therealong upon rotation of said driving gear, and stop means limiting axial movement of said driven gear along said shaft-like portion, said axially-movable driven gear being connected with and actuating said mechanical pitch-varying means whereby the pitch-setting of said airfoils will be changed upon application of driving power to said driving gear, and means for automatically returning said pitch-varying means to its original position upon cessation of said driving power, thereby to cause said airfoils to resume their original pitch-setting.

3. In an aircraft, a fuselage, a pylon extending upwardly from said fuselage, a concavely-spherical socket carried by said pylon, a supporting wing system above said pylon, and structural means interconnecting said wing system with said pylon including a shaft extending downwardly from said wing system and having a ball portion swivellably disposed in said socket and forming therewith a ball-and-socket joint, and load-bearing means intermediate said shaft and said pylon relieving said ball-and-socket joint of a substantial amount of load when said aircraft is supported by said wings, said load-bearing means comprising relatively slidable elements having juxtaposed conformingly-spherically-curved surfaces in load-transmitting contact with each other over a relatively substantial area, said elements being respectively fixedly-related to said pylon and to said shaft and arranged so that the common center of curvature of their engaged spherically-curved surfaces is coincident with the center of said ball-and-socket joint.

4. In an aircraft having a fuselage and an overhead wing system, a ball-and-socket joint intermediate said fuselage and said wing system including a concavely-spherical socket portion having a convexly-spherical ball portion swivellably disposed therein, said ball portion bearing four generally vertical slots disposed at 90 degree intervals therearound, four co-planar pins fixedly related to said socket portion projecting radially inwardly thereof and slidably into said slots, the projecting portions of said pins being of circular cross-section, whereby swivelling movement at said ball-and-socket joint will be confined to two perpendicularly-related generally vertical planes respectively passing through pairs of opposed slots and load-bearing means intermediate said wing system and said fuselage relieving said ball-and-socket joint of a substantial amount of load when said aircraft is supported by said wing system, said load-bearing means comprising relatively slidable elements having juxtaposed conformingly-spherically-curved surfaces in load-transmitting contact with each other over a relatively substantial area, said elements being respectively fixedly-related to said wing system and said fuselage and arranged so that the common center of curvature of their engaged spherically-curved surfaces is coincident with the center of said ball-and-socket joint.

5. In an aircraft having a power plant, an overhead wing system comprising a pair of wings extending oppositely outwardly from a common hub, said wings each being rotatably adjustable about their respective longitudinal axes, said hub being rotatably mounted on a tiltable pivot shaft, rotating means for said hub including a drive-shaft operatively connected to said power plant, a spur gear carried by the drive-shaft, a bevel gear permanently in mesh with said spur gear and means for axially advancing said bevel gear to a hub rotating position when said drive-shaft is rotated by said power plant and for axially retracting said bevel gear when said drive-shaft is not rotated by said power plant thereby to permit free rotation of said wings, pitch-varying means associated with said wings arranged automatically to change the pitch of said wings, said pitch-varying means including a pair of pivoted members carried by said hub and connected to said wings, said pivoted members being moved when said bevel gear is in its wing-driving position to tilt said wings to a value suitable for power-driven rotation of the wing system, said pivoted members being oppositely moved when said bevel gear is in its retracted position to change the pitch of said wings to a value suitable for free rotation of said wing system, releasable hub-locking means for locking said hub against rotation with the wings extending generally transversely of the body of said aircraft, and manually-operable means for setting said wings at pre-determined pitch for fixed-wing operation.

6. In an aircraft having a power plant, an overhead wing system comprising a pair of wings extending oppositely outwardly from a common hub, said wings each being rotatably adjustable about their respective longitudinal axes, said hub being rotatably mounted on a pivot shaft, said rotating means for said hub including a drive-shaft operatively connected to said power plant, a spur gear carried by the drive-shaft, a bevel gear permanently in mesh with said spur gear and means for axially advancing said bevel gear to a hub rotating position when said drive-shaft is rotated by said power plant and for axially retracting said bevel gear when said drive-shaft is not rotated by said power plant thereby to permit free rotation of said wings, and pitch-varying means associated with said wings arranged automatically to change the pitch of said wings, said pitch-varying means including a pair of pivoted members carried by said hub and connected to said wings, said pivoted members being moved when said bevel gear is in its wing-driving position to tilt said wings to a value suitable for power-driven rotation of the wing system, said pivoted members being oppositely moved when said bevel gear is in its retracted position to change the pitch of said wings to a value suitable for free rotation of said wing system.

7. In an aircraft having a power plant; an overhead wing system including a central rotatable hub, means permitting power-actuated and free rotation of said hub, said means including a gear axially helically movable to and fro, a pair of generally oppositely-extending stub-shafts extending outwardly from said hub, a pair of wings mounted on said stub shafts, and pivoted pitch-varying means actuated by the axial movement of said gear automatically to tilt said wings about their stub-shafts to the optimum angles for power-actuated and free rotation respectively.

8. In an aircraft having a power plant; an overhead wing system including a central rotatable hub, means permitting power-actuated and free rotation of said hub, said means including a gear axially helically movable to and fro, a pair of generally oppositely-extending stub-shafts extending outwardly from said hub, a pair of wings mounted on said stub shafts, pivoted pitch-varying means actuated by the axial movement of said gear automatically to tilt said wings about their stub-shafts to the optimum angles for power-actuated and free rotation respectively, and means for locking said wings in a position generally transverse to the body of the aircraft for fixed-wing operation.

THEODORE KLOEREN.